United States Patent [19]

Dini

[11] 4,144,546
[45] Mar. 13, 1979

[54] TELEVISION SIGNAL PROCESSING CIRCUIT FOR CORRECTING AMPLITUDE DISTORTIONS

[75] Inventor: Roberto Dini, Turin, Italy

[73] Assignee: Indesit Industria Elettrodomestici, Rivalta (Turin), Italy

[21] Appl. No.: 795,593

[22] Filed: May 10, 1977

[30] Foreign Application Priority Data

May 21, 1976 [IT] Italy ............................... 68242 A/76

[51] Int. Cl.² .......................... H04N 5/04; H04N 9/46
[52] U.S. Cl. .................................... 358/174; 358/148; 358/19
[58] Field of Search ........................ 358/19, 27, 35, 10, 358/148, 176, 188, 178

[56] References Cited

U.S. PATENT DOCUMENTS

| | | | |
|---|---|---|---|
| 2,798,900 | 7/1957 | Bradley | 358/27 |
| 3,005,869 | 10/1961 | Dolby | 358/148 |
| 3,730,984 | 5/1973 | Smith | 358/10 |

FOREIGN PATENT DOCUMENTS 816226  7/1959  United Kingdom ..................... 358/176

Primary Examiner—John C. Martin
Attorney, Agent, or Firm—Sughrue, Rothwell, Mion, Zinn and Macpeak

[57] ABSTRACT

Distortion introduced into a black and white or color television signal by for example private television repeaters or boosters in the input to a television receiver, particularly amplitude compression, is compensated by a signal processing circuit which detects distortion in the horizontal part of the black and white component of the received signal and generates a correcting signal. This correcting signal controls the gain of a variable gain amplifier, through which only the part of the received television signal including line, raster or color synchronization information is fed, the complete television signal being subsequently reconstituted after compensation of the first part.

9 Claims, 3 Drawing Figures

TELEVISION SIGNAL PROCESSING CIRCUIT FOR CORRECTING AMPLITUDE DISTORTIONS

The present invention relates to a television signal processing circuit for correcting distortions which may be present in a received television signal.

Before reaching the input of a receiver a television signal may be distorted in passing through amplifying and conversion circuits of poor quality such as for example, private television repeaters or signal boosters used to feed television signals to receivers in areas of poor reception which do not receive satisfactory signals directly from a transmitter, or amplifiers in centralized aerial or antenna installations or other similar apparatus. Since such circuits must generally be cheap they do not usually include professional components but rather components of the "civilian" type. Moreover such circuits are often so dimensioned that they operate at the limit of their performance. This can result in distortion, particularly compression of the amplitude of the television signal, due to the passage of the signal through amplifiers operating very close to saturation; such compression, in unfavourable cases, can reach a value close to 10dB.

According to the transmission standard G, used in Italy and in most European countries, the horizontal and vertical synchronization signals, and the colour synchronization signal, are allocated to the higher frequency part of the television signal. In such cases the aforesaid amplitude compression results in poor functioning of the television apparatus because the synchronization signals are altered, and consequently the reproduction of the picture is adversely affected. Furthermore, the amplitude compression influences the horizontal and vertical synchronization signals only when it reaches extreme levels, because the horizontal and vertical synchronization signals are of the pulse type, and their amplitude is not so important as their leading and trailing edges: the amplitude distortion must therefore exceed a certain threshold before the receiver "loses synchronism." The colour synchronization signal, however, contains the information in analogue form and the introduction into this signal of even small distortions has considerable repercussions on the fidelity of colour reproduction.

It must be borne in mind that normally in television receivers, the amplitude of the colour synchronization signal serves to control the automatic gain control circuit of the colour amplifiers, so that a wrong value of the amplitude of this signal produces a wrong value of the colour saturation. If, then, the amplitude compression of the colour synchronization signal is considerable, the point can be reached where the colour amplifiers are taken to saturation, with consequent undesirable results from the point of view of picture reproduction because the saturation of the colour amplifying stages causes, in addition to amplitude errors, phase errors which show up on the screen as tint errors. Moreover, in the case of considerable saturation, apart from tint and saturation errors, other errors are usually present, such as increased "cross colour".

This is due to the fact that when the colour amplifiers are working in the saturation region the spurious luminance information which, in spite of filtering, passes through the colour amplifiers, is on the whole lower than the chrominance information applied to a greater extent with respect to the chrominance signal, so that the ratio between the luminance and chrominance information is made to vary, thus losing the separation effect of the two picture components which was produced by poor quality amplifier or conversion circuits located upstream of the television receiver. An object of the present invention is to avoid the aforementioned.

According to the invention there is provided a processing circuit for black-and-white or colour television signals capable of correcting amplitude distortions in the received signal, characterised in that there are provided first means which analyse at least a selected part of the black-and-white component of the said signal for the purpose of detecting possible amplitude distortions present in the said signal, said analysing means generating a correction signal which is applied to second means which act on the said correction signal so as to compensate for the effect of such amplitude distortions.

The invention will be further described, by way of non-limiting example, with reference to the accompanying drawings, in which.

Figure 1:
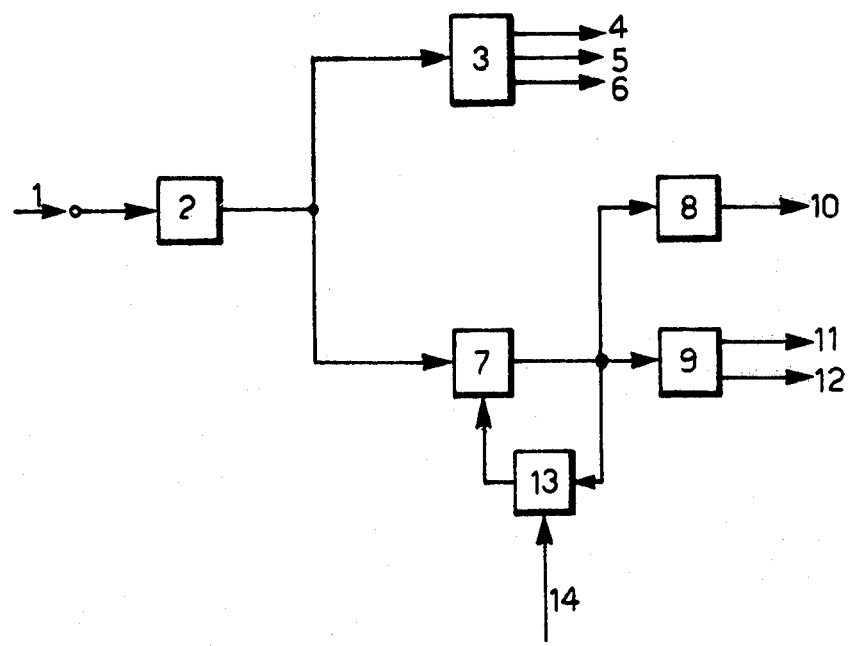
FIG. 1 is a block schematic diagram of a television signal processing circuit according to the present invention.

In FIG. 1, reference numeral 1 indicates a complete television signal of intermediate frequency, coming from respective intermediate frequency amplifiers in a television receiver. The signal 1 is detected in a detector or circuit 2 the output of which comprises a complete video frequency signal. This video signal is applied to the input of a filter circuit 3 which separates the audio, luminance and chrominance signals from each other and supplies them to respective outputs 4, 5 and 6.

The complete video signal is also applied to a variable gain amplifier 7 the output of which is connected to two synchronization separation circuits 8 and 9. The separation circuit 8 extracts from the complete video signal the colour synchronization signal, which appears at its output 10, whilst the separation circuit 9 extracts the vertical and horizontal synchronization signals which appear at respective outputs 11 and 12. The complete video signal present at the output of the variable gain amplifier 7 is also applied to a first input of a sampling circuit 13 which receives at a second input the horizontal flyback signal 14 from the television receiver.

The output of the sampling circuit 13 is utilized to control the gain of the amplifier 7.

The operation of the circuit is as follows. The audio, luminance and chrominance information (outputs 4, 5 and 6) are obtained normally, using known techniques, but the vertical, horizontal and colour synchronization signals, before reaching the normal synchronization separation circuits 8 and 9 pass through the variable gain amplifier 7. The sampling circuit 13 analyses the amplitude of the video synchronization signal with respect to the black pedestal and controls the gain of the amplifier 7 in response to any compressions which may occur in the amplitude of the synchronization signal in the received video signal. The sampling circuit 13 derives information relating to the presence of any compressions by sampling the value of the peak of the synchronization pulse and the black pedestal value. If the difference between these two values is not equal to 25% of the peak value of the synchronization pulse this means that the signal has been compressed. The circuit 13 then produces a control voltage which varies the gain of the amplifier 7 until this difference has been restored to the correct value.

In this way it is possible to expand the amplitude of the synchronization signals, thus compensating for any compressions introduced by the previously mentioned poor quality conversion or amplifier circuits upstream of the television receiver. As a result the aforementioned errors in the reproduction of the picture are avoided, and in particular the colour fidelity and the operation of the horizontal and vertical synchronization circuits are improved.

Figure 2:
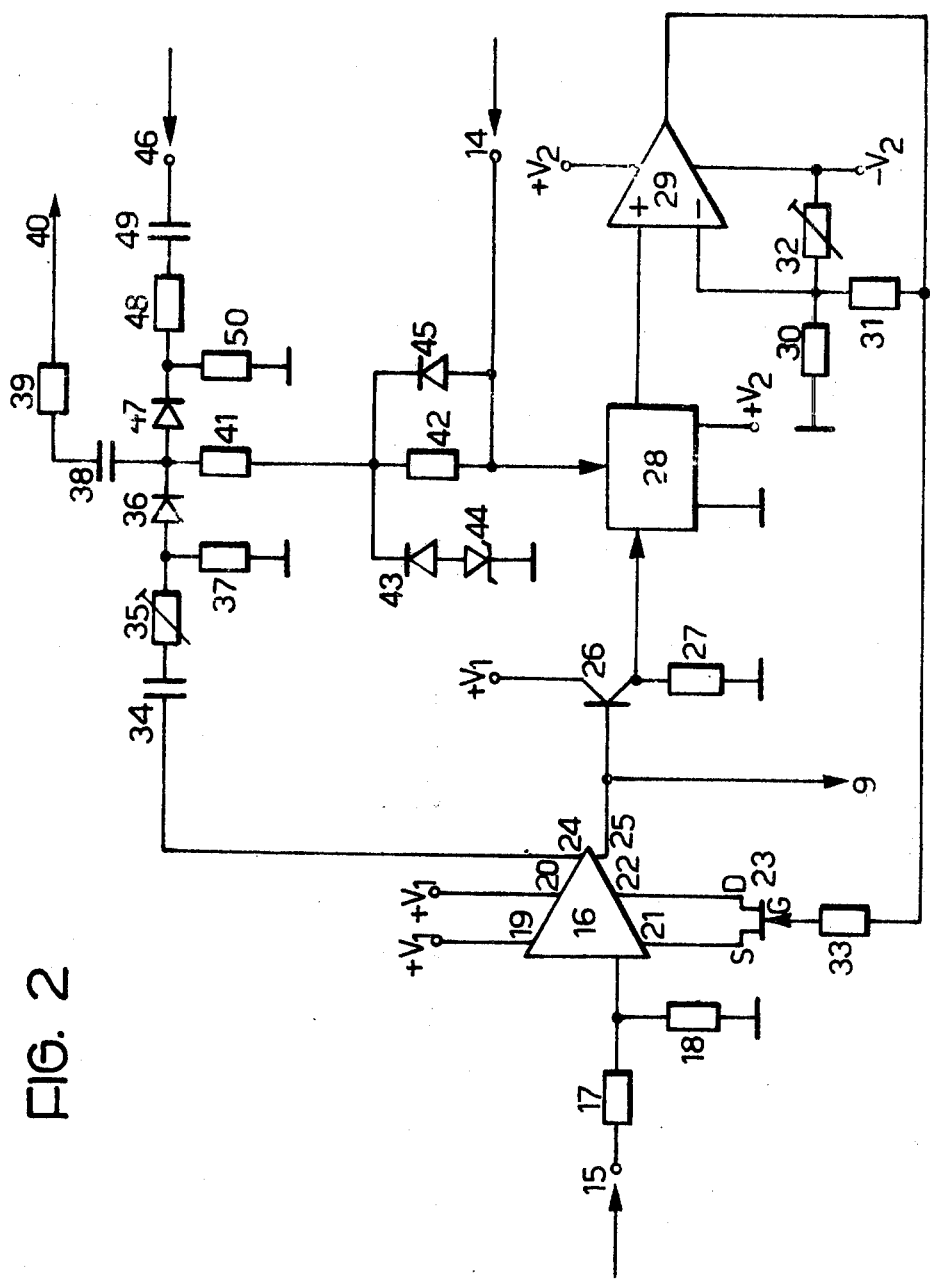
FIG. 2 is a circuit of part of the block schematic diagram of FIG. 1, according to one embodiment of the invention.

FIG. 2 shows one embodiment of the circuit blocks 7, 8 and 13 shown schematically in FIG. 1. The circuit has an input terminal 15 which corresponds to the input terminal of the variable gain amplifier 7 shown in FIG. 1. The input terminal 15 is connected to the input of a wide band amplifier 16 of the integrated circuit type through a resistor 17, the input of the amplifier 16 being also connected to earth through a resistor 18.

The amplifier 16 has two terminals 19 and 20 which are respectively connected to two bias voltage sources $+V_1$ and $-V_1$ and two terminals 21 and 22 connected respectively to the source S and drain D of a field effect transistor 23 which controls the gain of the amplifier 16. The amplifier has two output terminals 24 and 25 providing two balanced outputs comprising the video signal with opposite phases. The signal at the output terminal 25 is passed to the separation circuit 9 and to the base of a transistor 26 the emitter of which is connected to earth through a resistor 27. The collector of the transistor 26 is directly connected to the supply source $+V_1$.

The emitter of the transistor 26 is connected to a sampling circuit block 28 which corresponds to the sampling circuit 13 of FIG. 1, there being shown in detail only the circuit components responsible for amplifying the control signal provided by the block 28, this control signal being applied to the gate G of the field effect transistor 23 for the purpose of varying the gain of the amplifier 16.

The circuit block 28 has a first input which is connected to the emitter of the transistor 26, a second input which receives the aforementioned horizontal flyback signal 14, a terminal connected to a supply voltage $+V_2$, a terminal connected to earth and an output terminal at which there appears a signal representative of any sudden compression of the video signal. The said output terminal of the block 28 is connected to a non-inverting terminal of an operational amplifier 29 which has an inverting terminal connected to earth through a resistor 30 and to the output of the amplifier 29 through a resistor 31. The operational amplifier 29 is supplied from the two supply sources $+V_2$ and $-V_2$. Between the supply source $-V_2$ and the inverting input of the amplifier 29 a potentiometer 32 is connected. The output of the amplifier 29 is connected to the gate G of the field effect transistor 23 through a resistor 33.

The signal at the output terminal 24 of the variable gain amplifier 16 is passed via a capacitor 34 and a potentiometer 35 in series to the anode of a diode 36. The anode of the diode 36 is also connected to earth through a resistor 37. The cathode of the diode 36 is connected through a capacitor 38 and a resistor 39 in series to an output terminal 40 and through two resistors 41 and 42 in series to the input terminal for the horizontal flyback signal 14. The junction of the resistors 41 and 42 is connected to earth through a diode 43 and a Zener diode 44 in series. In parallel with the resistor 42 there is also connected a diode 45. The cathode of the diode 36 is also connected to an input terminal 46 for the video signal through a diode 47, a resistor 48 and a capacitor 49 in series. A resistor 50 is connected between the cathode of the diode 47 and earth.

The operation of the circuit illustrated in FIG. 2 is as follows.

The complete video signal applied to the terminal 15, which represents the input of the variable gain amplifier 7 of FIG. 1, passes through the wide amplifier 16 and is amplified with a gain dependent upon the degree of conduction of the transistor 23 which, in turn, is controlled by a control voltage generated by the sampling circuit block 28 and is amplified by the operational amplifier 29. Therefore the amplitude of the output signal of the amplifier 16 is such that, even if the video signal has undergone a compression, the difference in level between the crest of the synchronism pulse and the black pedestal is kept constant by the effect of the control signal generated by the sampling circuit block 28 which, as stated, samples these levels and generates a voltage which is a function of their difference. As will be better understood from the detailed description of sampling block circuit 28 with reference to FIG. 3, the gain of amplifier 16 is commuted between two ranges of values according to whether the signal which passes through it belongs to the first part or the remaining part of the television signal.

The outputs of the amplifier 16 are therefore capable of supplying the complete video signal of correct amplitude to the separation circuits 8 and 9 of FIG. 1.

In particular, the signal at the output terminal 25 is passed to the separation circuit 9 of the horizontal and vertical synchronization, whilst the signal at the output terminal 24 is passed to the diode 36 which is controlled by the horizontal flyback pulse present at the terminal 14 and which functions as a gate circuit separating the colour synchronization signal from the rest of the video signal and passing it to the output terminal 40.

The complete video signal, not corrected by the variable gain amplifier 7, is also present at the terminal 46. This video signal at the terminal 46 is deprived of the colour synchronization signal by the diode 47 controlled by the horizontal flyback signal. The video signal at the output terminal 40 will therefore consist of the uncorrected video information from the received signal and the colour synchronization which has been corrected by means of the variable gain amplifier 7. The signal at the output terminal 40 can be sent to the normal circuits for processing the chrominance signal.

The diodes 43 and 45, together with the zener diode 44, supply a control signal capable of switching the diodes 36 and 47 in a correct manner. In particular, the zener diode 44 ensures that the maximum negative voltage that the flyback pulse supplies to the diodes 36 and 47 does not exceed the zener voltage, whilst the diode 43 prevents reverse conduction of the zener diode 44 and the diode 45 functions in such a manner that the current which is passed to the diodes 36 and 47 is always the same both during the positive part and the negative part of the control signal.

Figure 3:
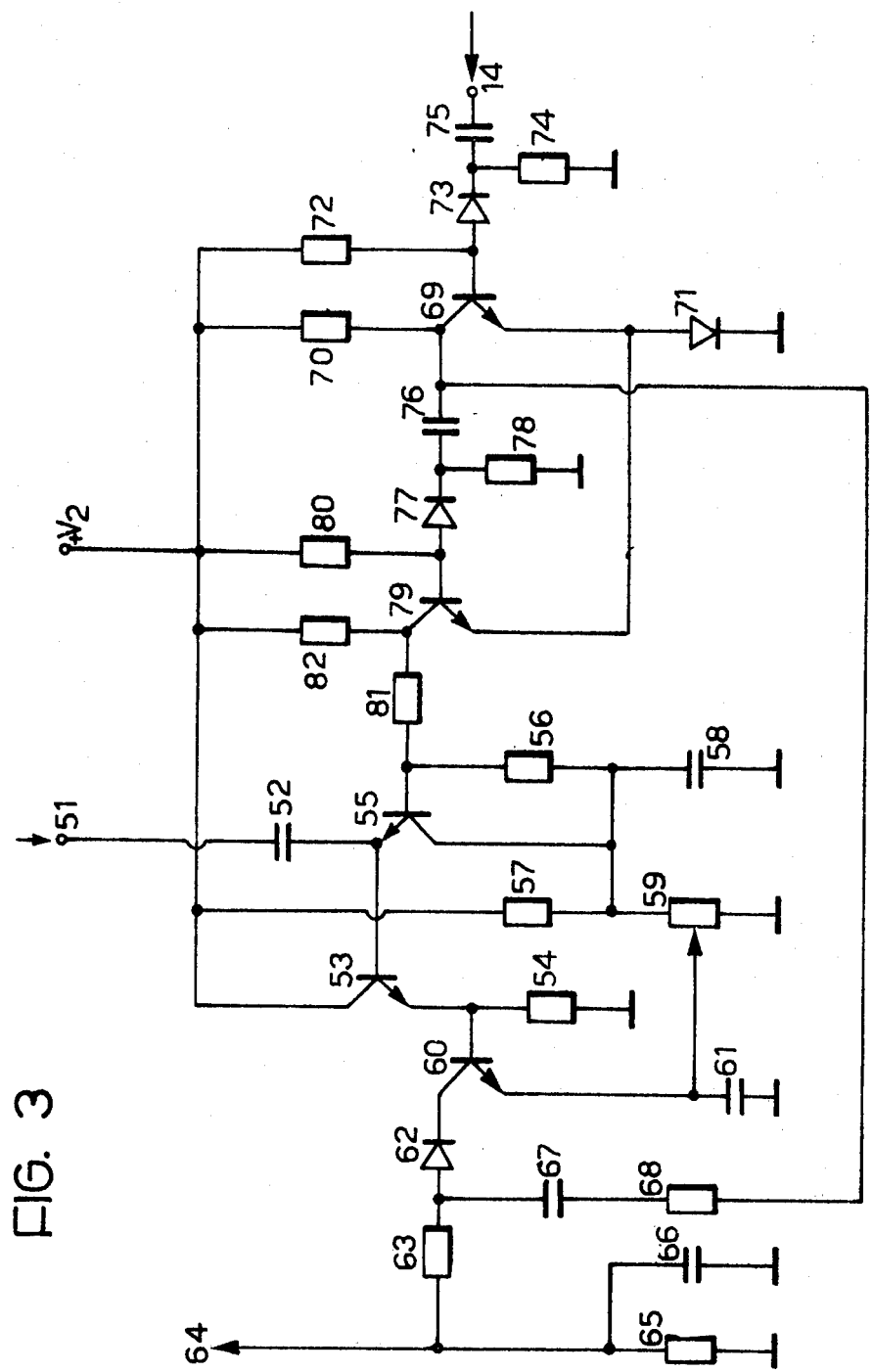
FIG. 3 illustrates one embodiment of a sampling circuit forming part of the block schematic diagram shown in FIG. 1.

FIG. 3 shows a practical circuit of the sampling circuit block 28 of FIG. 2.

The circuit of FIG. 3 has an input terminal 51 to which is applied the complete video signal coming from the emitter of the transistor 26 (FIG. 2). This signal is passed through a capacitor 52 to the base of a transistor 53 the collector of which is connected to the supply voltage $+V_2$ and the emitter of which is connected through a resistor 54 to the circuit earth. The base of the transistor 53 is also connected to the emitter of a transistor 55, the base of which is connected to the collector of the transistor 53 through resistors 56 and 57 in series. The collector of the transistor 55 is connected to the junction of resistors 56 and 57 and through a capacitor 58 to earth. A potentiometer 59 is connected across the capacitor 58. The slider of the potentiometer 59 is connected to the emitter of a transistor 60 the base of which is connected to the emitter of the transistor 53. The emitter of the transistor 60 is connected to earth through a capacitor 61. The collector of the transistor 60 is connected to the cathode of a diode 62 the anode of which is connected through a resistor 63 to an output terminal 64 which is connected to a non-inverting input of the amplifier 29 of FIG. 2. The output terminal 64 is connected to earth through a resistor 65 across which a capacitor 66 is connected.

The junction point of the resistor 63 and the diode 62 is connected through a capacitor 67 and a resistor 68 in series to the collector of a transistor 69 which is connected through a load resistor 70 to the supply voltage $+V_2$. The emitter of the transistor 69 is connected through a diode 71 to earth, while the base of the transistor 69 is connected through a bias resistor 72 to the input voltage $+V_2$ and directly to the anode of a diode 73, the cathode of which is connected to earth through a resistor 74. The horizontal flyback pulse present at the terminal 14 is applied to the cathode of the diode 73 through a capacitor 75. The collector of the transistor 69 is also connected through a capacitor 76 to the cathode of a diode 77 and the cathode of the latter is also connected to earth through a resistor 78.

The anode of the diode 77 is connected to the base of a transistor 79, the emitter of which is connected to the anode of the diode 71 and the base of which is also connected through a resistor 80 to the supply voltage $+V_2$. The collector of the transistor 79 is connected both to the base of the transistor 55 through a resistor 81 and to the input voltage $+V_2$ through a resistor 82.

The operation of the circuit of FIG. 3 will now be described. The circuit complex comprising the transistors 69 and 79 and of the diodes 71, 73 and 77 and associated networks of resistors and capacitors generates two reference signals in the form of rectangular pulses derived from the horizontal flyback signal present at the terminal 14 of the circuit. The two reference signals are obtained in the following manner: the negative flyback pulse present at the terminal 14 is differentiated by the network formed of the capacitor 75 and the resistor 74. Of the differentiated pulses which are thus derived only the negative one is allowed to pass through the diode 73 to the base of the transistor 69. The latter is normally saturated and therefore the voltage present on its collector is low; when the negative pulse arrives through the diode 73 the transistor 69 is cut off and its collector voltage then rises to the value $+V_2$ and remains at this value as long as the negative pulse lasts. At the end of the negative pulse the transistor 69 reverts to the state of saturation. The time constant of the capacitor 75 and resistor 74 is such that the transistor 69 remains cut off for about 5 microseconds (exactly the duration of the line synchronization pulse). A first reference signal therefore appears at the collector of the transistor 69, this first reference signal being itself in correspondence with the line synchronization pulse.

The first reference signal, apart from being sent to the clamping circuit, as will be seen later, is used for the generation of a second reference signal. In fact the signal on the collector of the transistor 69 is subsequently differentiated by the network formed of the resistor 78 and the capacitor 76, the negative peaks cutting off the transistor 79 so that at the collector of the latter a rectangular pulse appears in exactly the same manner as previously described for the transistor 69. The time constant of the resistor 78 and capacitor 76 is such that the pulse has a duration of about 4 microseconds. It should be noted that this pulse starts exactly at the end of the line synchronization pulse. The circuit formed by the transistors 53, 55 and 60, by the diode 62 with associated electrical network components forms the circuit which generates the gain control signal which is utilized to control the gain of the amplifier 16 of FIG. 2.

The complete video signal at the input terminal 51 coming from the transistor 26 of FIG. 2 is applied, through the capacitor 52, simultaneously to the base of the transistor 53 and to the emitter of the transistor 55. The latter, which receives on its base reference pulses coinciding with the black pedestal level supplied to it by the forming circuit, operates like a normal clamping circuit, and clamps the black level at the d.c. voltage present on its collector, which is obtained by division of the voltage $+V_2$ by means of the resistor 57 and the potentiometer 59. It will be noted that the transistor 55 is connected with reverse bias, because, as known, with this connection the transistor presents an extremely low internal resistance and therefore, operates upon saturation as an optimum short circuit. At the base of the transistor 55, therefore, the video signal is present with the black pedestal clamped at the level imposed on it by the above mentioned clamping circuit, and the same signal is repeated at the base of the transistor 60 with the black pedestal clamped, in this case at a voltage lower by about 0.6V than the level imposed by the aforesaid clamping circuit. The emitter of the transistor 60 is kept at a fixed voltage such that the transistor can only conduct when the voltage corresponding to the synchronization amplitude, which is applied to the base, has a stabilized value. Because the collector of the said transistor 60 receives, through the capacitor 67, the reference pulses supplied by the forming circuit, a clamping voltage is formed on the collector of the transistor 60 the level of which is proportional to the internal resistance presented by the transistor 60 and which is, therefore, a function of the amplitude of the signal present on the base. The band-pass filter formed by the resistors 63 and 65 and by the capacitor 66 extracts a d.c. voltage which is a function of the difference between the level corresponding to the synchronization peak and the black pedestal level and which can, therefore, be sent from the output terminal 64 to vary the gain of the amplifier 7 of FIG. 1 which is to be controlled. The only function of the diode 62 is to prevent the discharge of the capacitor 67 through the base-collector diode of the transistor 60.

The following table sets out typical values and type designations of components of the circuits described in FIGS. 2 and 3, relating to a practical embodiment of the invention which has proved effective in practice:

| Reference numeral | Component | Value/Type |
|---|---|---|
| 16 | integrated circuit | μA 733 |
| 17 | resistor | 5.6 Kohm |
| 18 | resistor | 220 Ohm |
| 23 | field effect transistor | 2N 3822 |
| 26 | transistor | BC 148C |
| 27 | resistor | 2.2 Kohm |
| 29 | integrated circuit | μA 741 |
| 30 | resistor | 680 Ohm |
| 31 | resistor | 39 Kohm |
| 32 | potentiometer | 1 Mohm |
| 33 | resistor | 100 Kohm |
| 34 | capacitor | 56 pF |
| 35 | potentiometer | 1 Kohm |
| 36 | diode | BA 129 |
| 37 | resistor | 2.2 Kohm |
| 38 | capacitor | 100 pF |
| 39 | resistor | 2.2 Kohm |
| 41 | resistor | 3.3 Kohm |
| 42 | resistor | 10 Kohm |
| 43 | diode | 1N 4148 |
| 44 | Zener diode | BZX55 C 6.8 |
| 45 | diode | 1N 4148 |
| 47 | diode | BA 129 |
| 48 | resistor | 2.2 Kohm |
| 49 | capacitor | 560 pF |
| 50 | resistor | 2.2 Kohm |
| 52 | capacitor | 2.2 μF |
| 53 | transistor | BC 148 C |
| 54 | resistor | 1 Kohm |
| 55 | transistor | BC 148 C |
| 56 | resistor | 220 Kohm |
| 57 | resistor | 1.2 Kohm |
| 58 | capacitor | 10 μF |
| 59 | resistor | 250 Ohm |
| 60 | transistor | BC 148 C |
| 61 | capacitor | 10 μF |
| 62 | diode | 1N 4148 |
| 63 | resistor | 12 Kohm |
| 65 | resistor | 33 Kohm |
| 66 | capacitor | 10 μF |
| 67 | capacitor | 47 nF |
| 68 | resistor | 4.7 Kohm |
| 69 | transistor | BC 148 C |
| 70 | resistor | 2.2 Kohm |
| 71 | diode | 1N 4148 |
| 72 | resistor | 100 Kohm |
| 73 | diode | 1N 4148 |
| 74 | resistor | 22 Kohm |
| 75 | capacitor | 15 pF |
| 76 | capacitor | 47 pF |
| 77 | diode | 1N 4148 |
| 78 | resistor | 22 Kohm |
| 79 | transistor | BC 148 C |
| 80 | resistor | 100 Kohm |
| 81 | resistor | 12 Kohm |
| 82 | resistor | 2.2 Kohm |
| $+V_1$ | supply voltage | +6V |
| $-V_1$ | supply voltage | −6V |
| $+V_2$ | supply voltage | +12V |
| $-V_2$ | supply voltage | −12V |

From the description which has been given the advantages of the circuit according to the present invention are clear. It is also evident that many variations are possible without, however, departing from the scope of the present invention.

For example, the circuit may employ, instead of the variable gain amplifier 7, the normal intermediate frequency amplifier, the gain of which can be controlled. In this case, the correction of the video signal would be made at the intermediate frequency and not at the video frequency, and should only be operative during the flyback period, for the purpose of avoiding influencing the amplitude of the signal which carries the video information. A further possibility of eliminating the effects of signal compression, applicable to colour reproduction only, is to reduce the gain of the chrominance amplifiers when the sampling circuit 13 detects the presence of a compression in the received signal.

We claim:

1. A television signal processing circuit for correcting amplitude distortions in a received signal, without using means sensitive to additional test signals purposely inserted into a transmitted television signal, comprising:
   (a) a first means which analyze only the scanning synchronization signals of the said received signal for the purpose of detecting possible amplitude distortions present in the said received signal, said first means generating a correction signal depending on the amplitude of the scanning synchronization signals measured from only the sync portion of black pedestal,
   (b) second means which act on the said received signal to compensate for the effect of such amplitude distortions.

2. A processing circuit as in claim 1, wherein said first means analyze the horizontal synchronization signals and comprise means sampling the difference between the level corresponding to the peak of the horizontal synchronization signal and the black pedestal level and generating a correction signal if the difference between the said two levels is not equal to a predetermined value.

3. A television signal processing circuit for correcting amplitude distortions in a received signal, without using means sensitive to additional test signals purposely inserted into a transmitted television signal, comprising:
   (a) first means which analyze only the scanning synchronization signals of the said received signal for the purpose of detecting possible amplitude distortions present in the said received signal, said first means generating a correction signal depending on the amplitude of the scanning synchronization signals measured from the black pedestal,
   (b) second means to compensate for the effect of such amplitude distortions which act only on a first part of the received television signal and there is provided a commutable variable gain amplifier, the gain of which is commuted between two ranges of values according to whether the signal which passes through it belongs to the said first part or to the remaining part of the television signal.

4. A television signal processing circuit for correcting amplitude distortions in a received signal, without using means sensitive to additional test signals purposely inserted into a transmitted television signal, comprising:
   (a) first means which analyze only the scanning synchronization signals of the said received signal for the purpose of detecting possible amplitude distortions present in the said received signal, said first means generating a correction signal depending on the amplitude of the scanning synchronization signals measured from the black pedestal,
   (b) second means to compensate for the effect of such amplitude distortions which act only on a first part of the received television signal and there are provided:
      (i) a variable gain amplifier through which said received signal passes,
      (ii) fixed gain means through which said received signal passes,
      (iii) means for separating the first part of the received television signal from the signal coming out from said variable gain amplifier,
      (iv) means for separating the remaining part of the received television signal from the signal coming out from said fixed gain means, and
      (v) means for combining the outputs of said variable gain amplifier and said fixed gain means.

5. A processing circuit as in claim 4 for use in a television receiver of the type having a horizontal deflection circuit which produces a horizontal flyback signal, including means supplying the said received television signal simultaneously to the said variable gain amplifier and to the said fixed gain means, said fixed gain means providing video information and said variable gain amplifier providing the horizontal, vertical and colour synchronization information, said first means having a first input to which the output of said variable gain amplifier is connected and a second input to which is applied said horizontal flyback signal, the output of said first means being connected to the gain control input of said variable gain amplifier.

6. A processing circuit as in claim 5, including a diode network for squaring and limiting said horizontal flyback signal taken out of said horizontal deflection circuit of the receiver and supplied to the first means.

7. A processing circuit as in claim 4, wherein said variable gain amplifier includes an operational amplifier having a negative feedback network and a field effect transistor interposed in said negartive feedback network and controlled by said correction signal to vary the gain of said variable gain amplifier.

8. A television signal processing circuit for use in a television receiver of the type having a horizontal deflection circuit which produces a horizontal flyback signal, said processing circuit correcting amplitude distortions in a received signal without using means sensitive to additional test signals purposely inserted into a transmitted television signal, comprising:

(a) first means which analyze only the scanning synchronization signals of the said received signal for the purpose of detecting possible amplitude distortions present in the said received signal, said first means generating a correction signal depending on the amplitude of the scanning synchronization signals measured from the black pedestal, wherein said first means include:

(i) means for deriving a video signal from said received signal,
(ii) a first transistor,
(iii) a first capacitor through which said video signal is applied to the emitter of said first transistor,
(iv) a reference signal generating circuit generating a first reference signal in the form of a rectangular pulse of a duration of the order of 4 microseconds and a second reference signal in the form of a rectangular pulse having a duration of the order of 5 microseconds, the base of said first transistor receiving said first reference signal in correspondence with the end of the horizontal synchronization signal and before the start of the information in said received signal,
(v) means applying a clamping voltage to the collector of the said first transistor,
(vi) a second transistor which receives on its base the said video signal with the black pedestal level clamped at the aforementioned clamping voltage,
(vii) a third transistor having a base connected to the emitter of the second transistor to receive the said video signal therefrom, the emitter of said third transistor being connected to a reference voltage,
(viii) a second capacitor connected to the collector of said third transistor to apply thereto, in correspondence with the start of the said horizontal synchronization signal, the second reference signal, and
(ix) a bandpass filter connected to the collector of the said third transistor, to supply at its output a signal proportional to the difference between the peak levels of the synchronization and black pedestal, (b) second means which act only on the sync portion of said received signal to compensate for the effect of such amplitude distortions.

9. A processing circuit as in claim 8, wherein the reference signal generating circuit includes:

an input to which the said horizontal flyback pulse is applied,
a first differentiating network connected to said input,
a first trigger circuit formed by at least a fourth transistor,
a first unidirectional conduction element connected between said first differentiating network and the base of said fourth transistor, the emitter of which is connected to a fixed reference potential and the collector of which constitutes a first output for the said first reference signal,
a second differentiating network for the differentiation of the signal present at the collector of the said fourth transistor,
a trigger circuit formed by at least a fifth transistor, and
a second unidirectional conduction element connected between said second network and the base of the fifth transistor, the emitter of which is connected to a fixed reference potential and the collector of which constitutes a second output for the said second reference signal.

* * * * *